United States Patent [19]
Kim

[11] Patent Number: 5,995,158
[45] Date of Patent: Nov. 30, 1999

[54] BLANKING SIGNAL GENERATING CONTROL CIRCUIT OF A VIDEO APPARATUS

[75] Inventor: Young-Chul Kim, Seoul, Rep. of Korea

[73] Assignee: Samsung Electronics Co., Ltd., Kyungki-Do, Rep. of Korea

[21] Appl. No.: 08/740,492

[22] Filed: Oct. 30, 1996

[30] Foreign Application Priority Data

Dec. 30, 1995 [KR] Rep. of Korea ...................... 95-68626

[51] Int. Cl.⁶ .............................. H04N 5/10; H04N 5/08
[52] U.S. Cl. ........................................... 348/529; 348/525
[58] Field of Search .................................... 348/529, 530, 348/527, 525, 506, 547, 548, 558, 554, 555; H04N 5/10, 5/08

[56] References Cited

U.S. PATENT DOCUMENTS

| | | | |
|---|---|---|---|
| 4,357,630 | 11/1982 | Odaka ....................................... | 348/529 |
| 4,459,612 | 7/1984 | Shinkai et al. ........................... | 348/529 |
| 5,012,340 | 4/1991 | Kirschenstein .......................... | 358/150 |
| 5,467,140 | 11/1995 | Sohn ........................................ | 348/529 |
| 5,754,251 | 5/1998 | Hulvey ..................................... | 348/529 |

*Primary Examiner*—Michael H. Lee
*Attorney, Agent, or Firm*—Sughrue, Mion, Zinn, Macpeak & Seas, PLLC

[57] ABSTRACT

A blanking signal generating control circuit for use in a video apparatus is disclosed. The blanking signal control circuit according to the present invention has structure which makes it easily adaptable for use with different broadcast standards, such as NTSC, PAL, SECAM, etc. The control circuit has an edge detector which generates a front edge detecting signal at the front edge of the vertical sync signal, and a rear edge detecting signal the trailing (or rear) edge of the vertical sync signal. The control circuit also has a field distinction signal generator for detecting odd and even fields in a video signal. A counting controller generates a counting control signal synchronized with the front edge detecting signal in response to the field distinction signal and a broadcasting system select signal. Line counting is performed starting from an initial value which is selected from a first or second initial value in response to the field distinction signal. Counting is done based on a pulse signal having a frequency of twice a horizontal synchronizing signal used as a clock signal, to generate a counted value. A comparator compares the counted value with a value which has been previously set to correspond to a selected broadcasting system; when the comparator indicates equality, a blanking signal is generated.

6 Claims, 5 Drawing Sheets

BLANKING SIGNAL GENERATING CONTROL CIRCUIT OF A VIDEO APPARATUS

FIELD OF THE INVENTION

The present invention relates to a blanking signal generating control circuit of a video apparatus, and more particularly to such a blanking signal generating control circuit which is compatible with video signals of different broadcasting systems by an external adjustment in a video apparatus such as a computer monitor.

BACKGROUND OF THE INVENTION

In order that a video apparatus compatibly use video signals of different signalling systems, an analog signal is converted to a digital signal, and a timing signal corresponding to each portion of the video signal is generated through digital signal processing. The video apparatus receives the timing signal and generates the video signal suitable for a computer monitor for example. However, in a vertical synchronizing region of the video signal, since there is no chrominance signal, a timing signal indicating a position of a color burst signal for generating the chrominance signal should be not applied.

In the prior art, a position of a vertical synchronizing signal is sensed by counting the number of a horizontal synchronizing signals of a specific broadcasting system. Therefore, the compatibility with the video signals of difference broadcasting systems such as NTSC, PAL, etc. is difficult.

SUMMARY OF THE INVENTION

It is an object of the invention to provide a blanking signal generating control circuit of a video apparatus which is compatible with video signals of different broadcasting systems by an external adjustment.

A blanking signal generating control circuit of a video apparatus embodying the present invention includes: an edge detector for generating a front edge detecting signal and a rear edge detecting signal by detecting the front edge and the rear edge, respectively, of a vertical synchronizing signal, and generating a delayed vertical synchronizing signal; a field distinction signal generator for detecting odd and even fields in response to a level of an active video signal at the rear edge of the delayed vertical synchronizing signal, and generating a field distinction signal; a counting controller for generating a counting control signal synchronized with the front edge detecting signal of the edge detector in response to the field distinction signal and a broadcasting system select signal; a line counting circuit for selecting a first or second initial value in response to the field distinction signal, loading the selected initial value in response to the counting control signal, receiving a pulse signal having a frequency of twice a horizontal synchronizing signal as a clock signal, counting from the loaded initial value, and generating the counted value; a comparator for comparing the counted value of the line counting circuit with a detecting value previously set to correspond to a selected broadcasting system, and generating an equality signal when the counted value is equal to the detecting value; and a blanking signal generator for generating a blanking signal.

The edge detector includes a delay circuit for delaying the vertical synchronizing signal in response to a clock signal; a front edge detector for generating the front edge detecting signal of the vertical synchronizing signal by combining the vertical synchronizing signal with the delayed vertical synchronizing signal generated from the delay circuit; and a rear edge detector for generating the rear edge detecting signal of the vertical synchronizing signal by combining the vertical synchronizing signal with the delayed vertical synchronizing signal.

The field distinction signal generator includes: a latch circuit for latching the level of the active video signal at the rear edge of the delayed vertical synchronizing signal; a malfunction preventing circuit for selecting a current latched value when current and previous values latched to the latch circuit are different, and selecting an inverted signal of a previous field distinction signal when the current and previous values are equal to each other; and an output circuit for generating, as the field distinction signal, a signal generated from the malfunction preventing circuit in synchronization with the clock signal.

The counting controller includes: a pulse generator for generating the counting control signal having a prescribed pulse width in response to the front edge detecting signal; and an output controller for controlling the counting control signal so as to be generated every field or every even field, in response to the broadcasting system select signal and the field distinction signal.

The line counting circuit includes: an initial value select circuit for selecting a first or second initial value in response to the field distinction signal; and a counter for loading the selected initial value in response to the counting control signal, receiving a pulse signal having a frequency of twice a horizontal synchronizing signal as a clock signal, and counting from the loaded initial value, thereby generating a counted value.

The blanking signal generator includes: a delay circuit for delaying the equality signal by one horizontal line by the pulse signal which has a frequency of twice the horizontal synchronizing signal; and an output circuit for generating the blanking signal synchronized with the clock signal in response to the delayed equality signal and the rear edge detecting signal of the edge detector.

BRIEF DESCRIPTION OF THE DRAWINGS

The above objects, and other features and advantages of the present invention will be more apparent after a reading of the following detailed description taken in conjunction with the drawings, in which.

DETAILED DESCRIPTION OF PREFERRED EMBODIMENT

Figure 1:
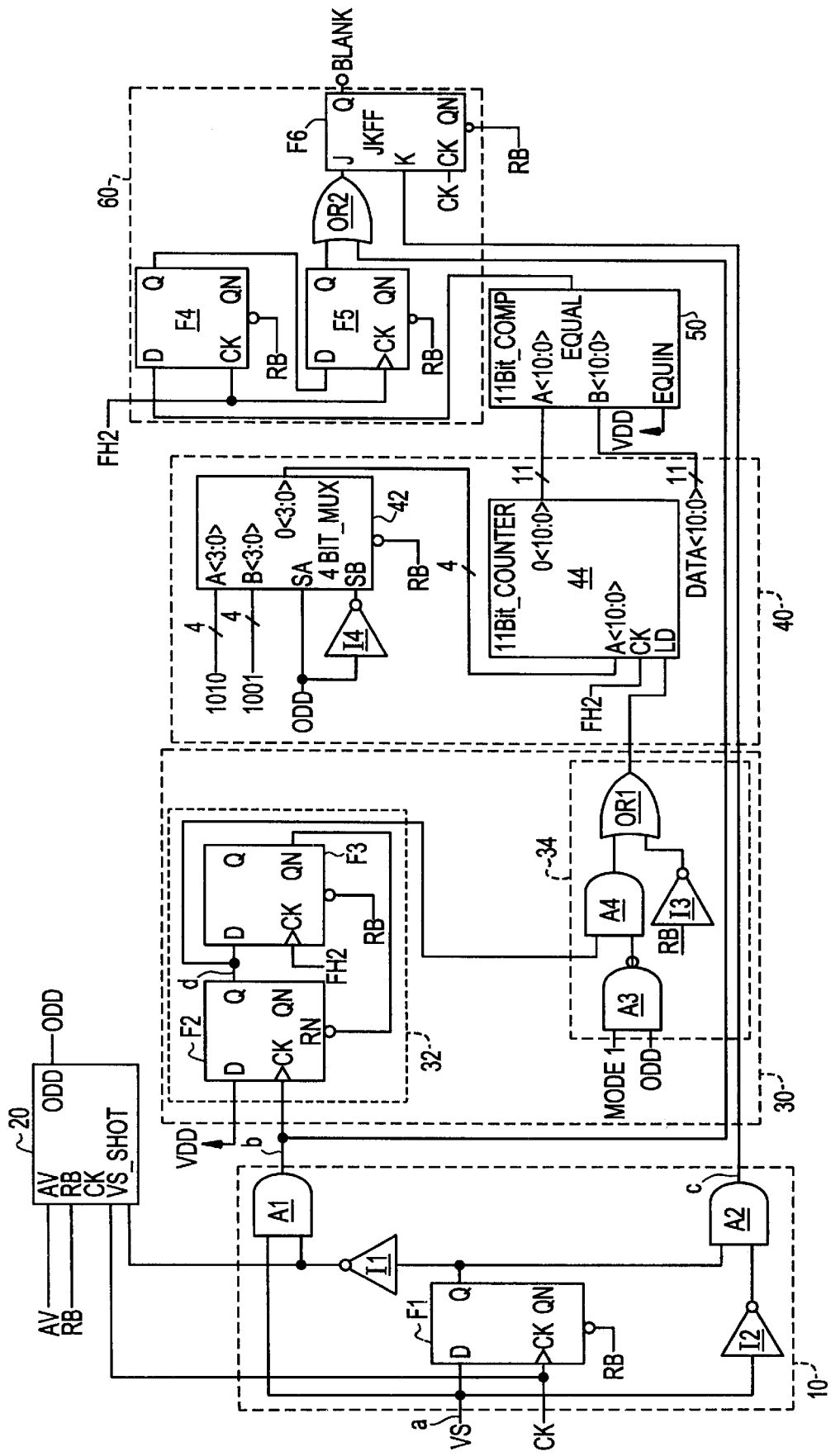
FIG. 1 is a circuit diagram illustrating a blanking signal generating control circuit of a video apparatus according to the present invention.
Figures 5A, 5B, 5C, 5D:
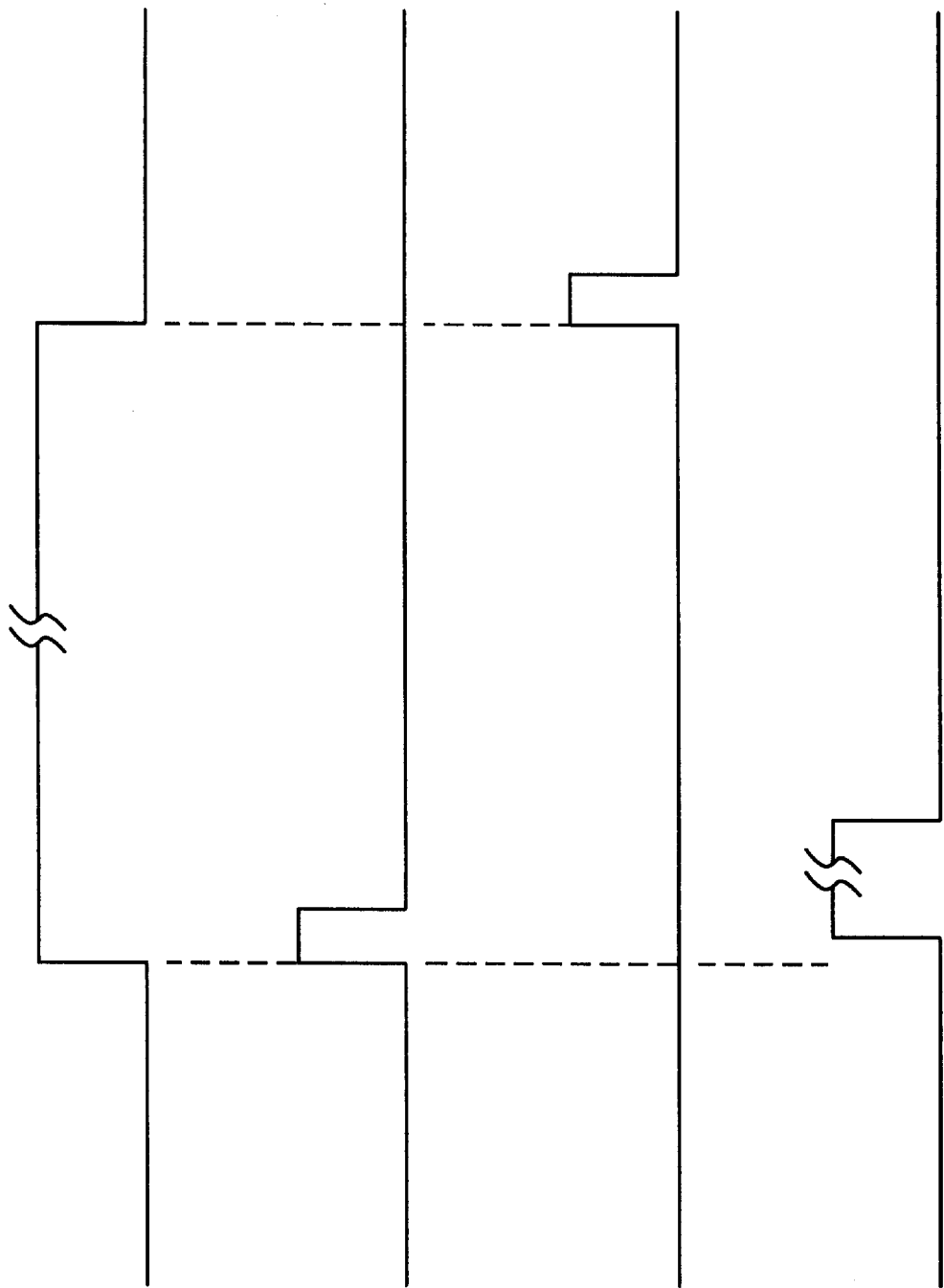
FIGS. 5A–5D are waveforms at main portions of the circuit of FIG. 1.

Referring to FIG. 1, an edge detector 10 includes a delay circuit, a front edge detector for generating a front edge detecting signal b shown in FIG. 5B, and a rear edge detector for generating a rear edge detecting signal c shown in FIG.

5C. The delay circuit has a flip-flop F1 for latching a vertical synchronizing signal VS according to a system clock signal CK to be delayed by one clock cycle. The front edge detector has an inverter I1 for inverting a delayed vertical synchronizing signal generated from the flip-flop F1, and an AND gate A1 for ANDing an output signal of the inverter I1 with the vertical synchronizing signal VS. The rear edge detector includes an AND gate A2 for ANDing the delayed vertical synchronizing signal generated from the flip-flop F1 with an inverted vertical synchronizing signal generated from an inverter I2.

Figure 2:
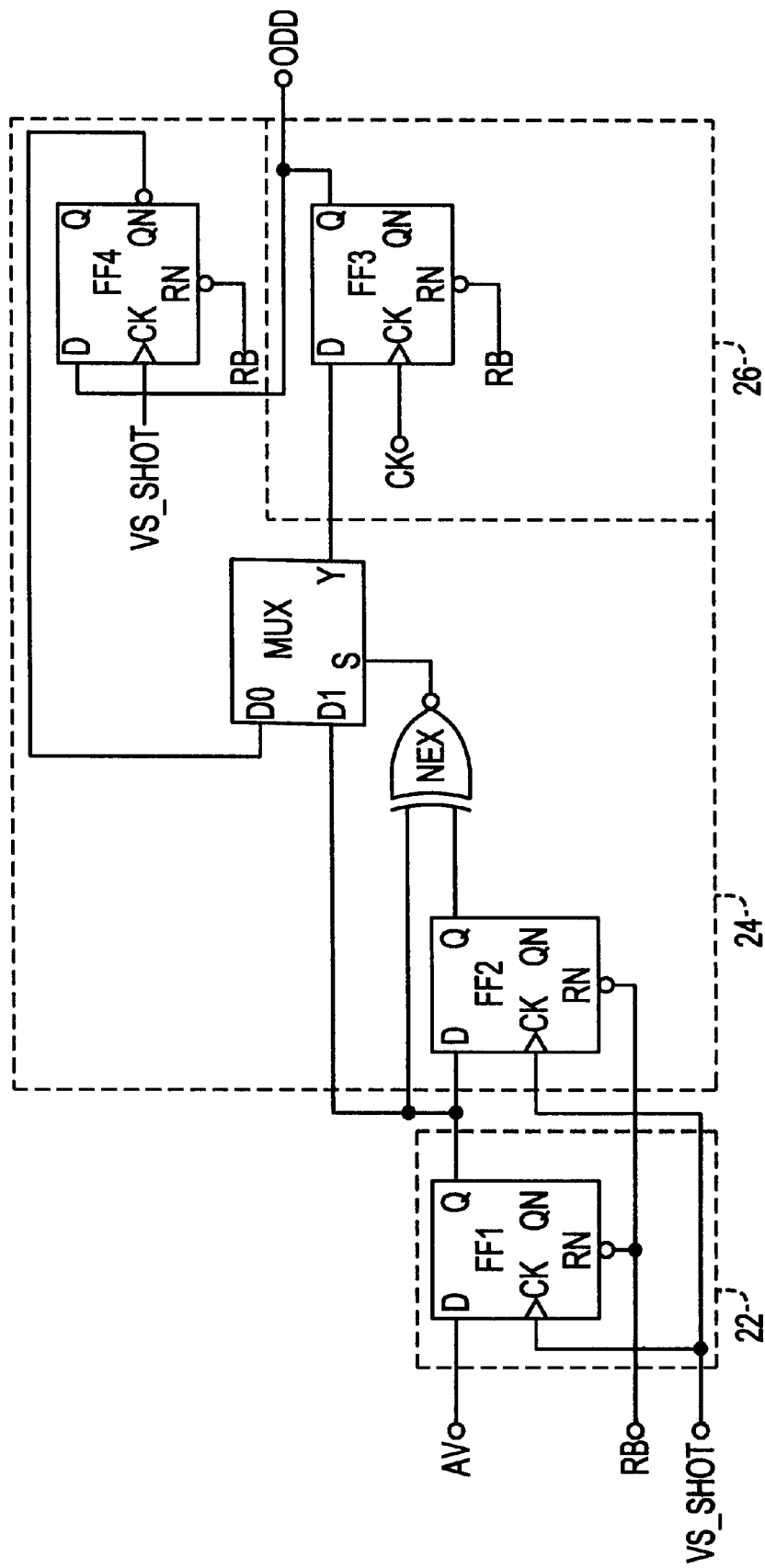
FIG. 2 is a detailed circuit diagram of a field distinction signal generator shown in FIG. 1.

A field distinction signal generator 20 includes, as shown in FIG. 2, a latch circuit 22, a malfunction preventing circuit 24 for preventing a field distinction malfunction by a noise component contained in the vertical synchronizing signal VS, and an output circuit 26. The latch circuit 22 has a flip-flop FF1 for receiving, as a clock signal, a delayed and inverted vertical synchronizing signal VS_SHOT generated from the edge detector 10 and latching an active video signal AV corresponding to an active interval of a video signal of each horizontal line. The malfunction preventing circuit 24 has a flip-flop FF2 for latching a field distinction signal ODD previously latched from the flip-flop FF1, a flip-flop FF4 for latching the previous field distinction signal in response to the delayed and inverted vertical synchronizing signal VS_SHOT received as the clock signal and generating an inverted signal of the latched signal, an exclusive NOR gate NEX for judging that an operation is normal when signals generated from the flip-flops FF1 and FF2 are different and that an operation is abnormal when they are the same, and a multiplexer MUX for multiplexing a current field distinction signal latched from the latch circuit 22 and the previous field distinction signal latched from the flip-flop FF4 according to a signal generated from the exclusive NOR gate NEX. During an abnormal operation, the malfunction preventing circuit 24 generates the current field distinction signal by selecting the field distinction signal phase-inverted by 180° with the previous field distinction signal. Consequently, even during the abnormal operation, a correct field distinction signal is generated. The output signal 26 has a flip-flop FF3 for latching the signal generated from the multiplexer MUX according to the clock signal and generating the field distinction signal synchronized with the clock signal.

A counting controller 30 includes a pulse generator 32 for generating a counting control signal d having a prescribed pulse width in response to the front edge detecting signal b, and an output controller 34 for controlling the counting control signal d so as to be generated every field or every even field in response to a broadcasting system select signal MODE1 and the field distinction signal ODD.

The pulse generator 32 includes a flip-flop F2 for receiving the front edge detecting signal b as the clock signal and latching a power voltage VDD, and a flip-flop F3 for receiving, as the clock signal, a pulse signal FH2 having a frequency of twice a horizontal synchronizing signal, latching an output of the flip-flop F2, generating an inverted signal of the latched signal and resetting the flip-flop F2. Therefore, the pulse generator 32 generates the counting control signal d having a pulse width of one period of the pulse signal FH2 from the front edge of the vertical synchronizing signal VS, as shown in FIG. 5D.

The output controller 34 includes a NAND gate A3 for combining the field distinction signal ODD generated from the field distinction signal generator 20 with the broadcasting system select signal MODE1, an AND gate A4 for controlling the counting control signal d by a signal-generated from the NAND gate A3, an inverter I3 for inverting a reset signal RB, and an OR gate OR1 for ORing a signal generated from the AND gate A4 with the inverted reset signal. That is, the counting controller 30 generates a loading control signal having a pulse width of one period of the pulse signal FH in response to the front edge of the vertical synchronizing signal.

A line counting circuit 40 has a multiplexer 42 for selecting an initial value "1001" or "1010" set according to the field distinction signal ODD generated from the field distinction signal generator 20, and an 11-bit counter 44 for receiving the pulse signal FH2 as the clock signal and counting from a loaded initial value. The initial value selected by the multiplexer 42 is loaded to the counter 44 by the counting control signal. In the case of the NTSC broadcasting system, if a previous field is an even field, a signal of logic "high" is supplied to a terminal SB of the multiplexer 42 and the initial value "1001" is selected. Therefore, the initial value of 9 is loaded to the counter 44 and the number of lines of a current odd field is counted.

A comparator 50 receives data generated from the line counting circuit 40 through a terminal A<10:0> and receives data "526" which is received from the exterior or corresponds to the NTSC television system through a terminal B<10:0>. When the received data is the same, the comparator 50 generates an equality signal of logic "high".

A blanking signal generator 60 has cascade-connected flip-flops F4 and F5 for receiving the pulse signal FH2 as the clock signal and delaying the equality signal generated from the comparator 50 by one horizontal line, an OR gate OR2 for ORing a signal generated from the flip-flop F5 with the front edge detecting signal b, and a flip-flop F6 for receiving a signal generated from the OR gate OR2 and the rear edge detecting signal c through its input terminals J and K, respectively, and generating a blanking signal BLANK synchronized with the clock signal CK. The cascade-connected flip-flops F4 and F5 and the OR gate OR2 constitute a delay circuit, and the flip-flop F6 constitutes an output circuit.

In operation, if a signal supplied to an input terminal LD of the counter 44 of the line counting circuit 40 is logic "1", the counter 44 counts up from a value applied to its input terminal A<10:0>. If the broadcasting system select signal MODE1 applied to the AND gate A3 is logic "0", the AND gate A4 is always in an enabled state. Therefore, each time the vertical synchronizing signal VS is generated, an output of the counter 44 is initialized to 9 or 10.

If the broadcasting system select signal MODE1 is logic "1", the output of the flip-flop F2 may be not or may be transmitted to the input terminal LD of the counter 44 according to the field distinction signal ODD. When the broadcasting mode select signal MODE1 is logic "1", if the field distinction signal ODD is logic "0" (an even field), the output of the flip-flop F2 is applied to the input terminal LD of the counter 44, and if the field distinction signal ODD is logic "1" (an odd field), the output of the flip-flop F2 is not transmitted to the input terminal LD of the counter 44.

Therefore, if the broadcasting system select signal MODE1 is logic "1", one blanking signal per frame is generated. In a video signal of the NTSC system, logic "0" is used as the broadcasting system select signal MODE1.

If the output of the flip-flop F2 is supplied to the counter 44 to load 9 or 10 generated from the multiplexer 42, since a signal generated from an inversion output terminal of the flip-flop F3 is supplied to a reset terminal of the flip-flop F2, the output of the flip-flop F2 supplied to the counter 44 has logic "1" only during one period of the pulse signal FH2. If the data generated from the counter 44 is the same as the specified data "526", the comparator 50 generates the equality signal of logic "1".

The counter 44 receives the pulse signal FH2 as the clock signal and implements a counting operation. Since the pulse signal FH2 has two pulses per horizontal line, the number of horizontal lines during counting from 9 to 526 is 260. Therefore, if the counted value is 263, the output of the comparator 50 becomes a pulse of logic "1". The output of the comparator 50 is delayed by twice the pulse signal FH2 and applied to the input terminal J of the flip-flop F6. Since two periods of the pulse signal FH2 correspond to one horizontal line, the blanking signal BLANK is set to logic "1" when the counted value of the horizontal line is 264.

If the vertical synchronizing signal VS is lowered to logic "0" after the blanking signal is set to logic "1" and if the vertical synchronizing interval is over, the rear edge detecting signal corresponding to one period of the system clock at the rear edge of the vertical synchronizing signal VS by the output of the AND gate A2 is applied to the input terminal K of the flip-flop F6 and the blanking signal is again lowered to logic "0".

Figure 3:
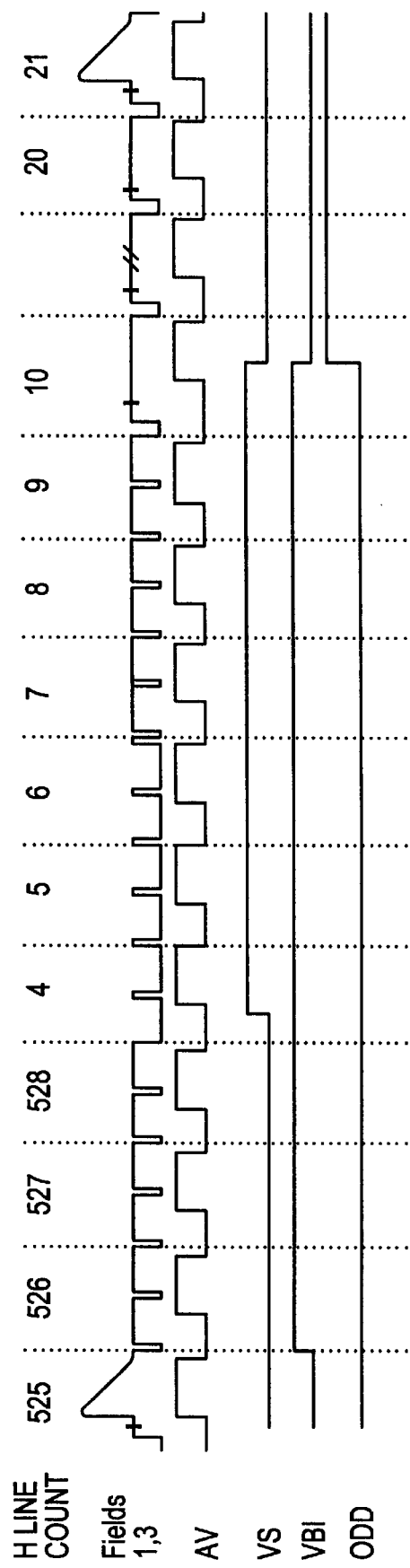
FIGS. 3 and 4 are timing diagrams illustrating waveforms corresponding to a composite video signal, an active video signal, a vertical synchronizing signal, a blanking signal and a field distinction signal in odd and even fields of a television signal of the NTSC system.
Figure 4:
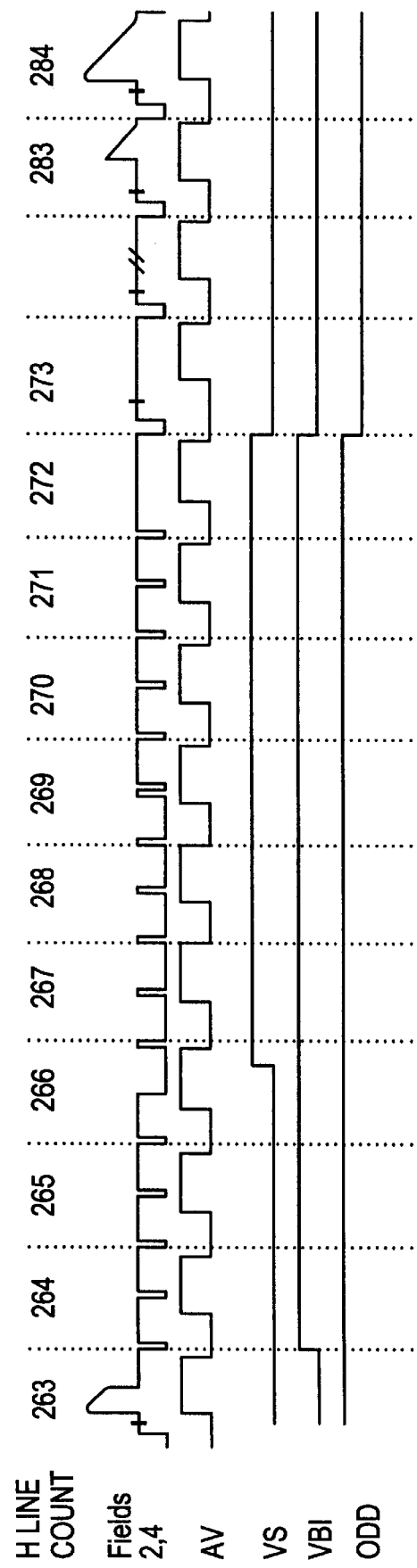

At an interval in which an odd field is over, 10 rather than 9 is loaded to the counter 44. As is known from waveforms in odd and even fields shown in FIGS. 3 and 4, the counter 44 counts up from 10 at the counted value of 266. At the counted value of 525, a pulse is generated from the flip-flop F4, and the pulse delayed by one horizontal line through the flip-flops F4 and F5 is supplied to the input terminal J of the flip-flop F6. Therefore, the blanking signal is set to logic "1" and again lowered "0" by the rear edge detecting signal of the vertical synchronizing signal VS.

Although the preferred embodiment of the present-invention has been applied to the television signal of the NTSC system, the blanking signal for other broadcasting systems such as PAL and SECAM can be generated by externally adjusting the broadcasting system select signal, the initial value, the reference value of the comparator 50, etc.

As described above, since the initial value of the counter, the loading of the initial value and the compared value of the comparator are externally adjusted, the banking signal which is suitable for the broadcasting system can be generated by setting data suitable for the desired broadcasting system.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A blanking signal generating control circuit for use in a video apparatus, comprising:

edge detecting means for generating a front edge detecting signal by detecting a front edge of a vertical synchronization signal, and a rear edge detecting signal by detecting a rear edge of the vertical synchronizing signal, and generating a delayed vertical synchronizing signal;

field distinction signal generating means for detecting odd and even fields in response to a level of an active video signal at the rear edge of said delayed vertical synchronizing signal, and generating a field distinction signal;

counting control means for generating a counting control signal synchronized with said front edge detecting signal of said edge detecting means in response to said field distinction signal and a broadcasting system select signal;

line counting means for selecting a first or second initial value, as a selected initial value, in response to said field distinction signal, loading the selected initial value in response to said counting control signal, receiving a pulse signal having a frequency of twice a horizontal synchronizing signal as a clock signal, counting from the loaded initial value, and generating a counted value;

comparing means for comparing said counted value of said line counting means with a detecting value previously set to correspond to a selected broadcasting system, and generating an equality signal when said counted value is equal to said detecting value; and blanking signal generating means for generating a blanking signal, an interval of said blanking signal being determined by said equality signal and said rear edge detecting signal of said edge detecting means.

2. The blanking signal generating control circuit as claimed in claim 1, wherein said edge detecting means comprises:

delay means for delaying said vertical synchronizing signal in response to a clock signal;

front edge detecting means for generating said front edge detecting signal by combining said vertical synchronizing signal with the delayed vertical synchronizing signal generated from said delay means; and rear edge detecting means for generating said rear edge detecting signal by combining said vertical synchronizing signal with said delayed vertical synchronizing signal.

3. The blanking signal generating control circuit as claimed in claim 1, wherein said field distinction signal generating means comprises:

latch means for latching the level of said active video signal at the rear edge of said delayed vertical synchronizing signal;

malfunction preventing means for selecting a current latched value when current and previous values latched to said latch means are different, and selecting an inverted signal of a previous field distinction signal when said current and previous values are equal to each other; and output means for generating, as said field distinction signal, a signal generated from said malfunction preventing means in synchronization with said clock signal.

4. The blanking signal generating control circuit as claimed in claim 1, wherein said counting control means comprises:

pulse generating means for generating said counting control signal having a prescribed pulse width in response to said front edge detecting signal; and output control means for controlling said counting control signal so as to be generated every field or every even field in response to said broadcasting system select signal and said field distinction signal.

5. The blanking signal generating control circuit as claimed in claim 1, wherein said line counting means comprises:

initial value select means for selecting a first or second initial value in response to said field distinction signal; and a counter for loading the selected initial value in response to said counting control signal, receiving a pulse signal having a frequency of twice a horizontal synchronizing signal as a clock signal, counting from the loaded initial value, and generating the counted value.

6. The blanking signal generating control circuit as claimed in claim 1, wherein said blanking signal generating means comprises:

delay means for delaying said equality signal by one horizontal line by said pulse signal having a frequency of twice said horizontal synchronizing signal; and output means for generating said blanking signal synchronized with said clock signal in response to the delayed equality signal and said rear edge detecting signal of said edge detecting means.

* * * * *